US011102714B2

(12) United States Patent
Li et al.

(10) Patent No.: US 11,102,714 B2
(45) Date of Patent: Aug. 24, 2021

(54) METHOD AND APPARATUS FOR OBTAINING SYSTEM INFORMATION

(71) Applicant: Huawei Technologies Co., Ltd., Shenzhen (CN)

(72) Inventors: Sainan Li, Chengdu (CN); Yalin Liu, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 63 days.

(21) Appl. No.: 16/673,068

(22) Filed: Nov. 4, 2019

(65) Prior Publication Data

US 2020/0068489 A1 Feb. 27, 2020

Related U.S. Application Data

(63) Continuation of application No. PCT/CN2018/085535, filed on May 4, 2018.

(30) Foreign Application Priority Data

May 5, 2017 (CN) .......................... 201710313816.3

(51) Int. Cl.
*H04W 48/16* (2009.01)
*H04L 5/00* (2006.01)
(Continued)

(52) U.S. Cl.
CPC .......... *H04W 48/16* (2013.01); *H04L 5/0007* (2013.01); *H04W 48/14* (2013.01); *H04W 74/002* (2013.01); *H04W 74/0833* (2013.01)

(58) Field of Classification Search
CPC ... H04W 48/16; H04W 48/14; H04W 74/002; H04W 74/0833; H04W 48/12;
(Continued)

(56) References Cited

U.S. PATENT DOCUMENTS

2011/0317648 A1 12/2011 Lee et al.
2012/0008524 A1 1/2012 Amirijoo et al.
(Continued)

FOREIGN PATENT DOCUMENTS

CN 101217689 A 7/2008
CN 102342145 A 2/2012
(Continued)

OTHER PUBLICATIONS

Deutsche Telekom, "Our View on the "Chiba issue"—RACH access failure", 3GPP TSG RAN WG2 #82, R2-131654, May 20-24, 2013, 2 Pages, Fukuoka, Japan.
(Continued)

*Primary Examiner* — Afshawn M Towfighi
(74) *Attorney, Agent, or Firm* — Slater Matsil, LLP

(57) ABSTRACT

This application provides a method and an apparatus for obtaining system information SI. The method includes: sending, by a terminal device, a first message to a network device, where the first message includes first request information used to request first system information SI; and detecting, by the terminal device, a second message and obtaining the first SI, where the second message includes information used to respond to the request of the first request information. The terminal device may send the first request
(Continued)

Network device 110                    Terminal device 120 information to the network device based on an actual requirement, and detect the second message on a preset time-frequency resource.

19 Claims, 9 Drawing Sheets

(51) Int. Cl.
*H04W 48/14* (2009.01)
*H04W 74/00* (2009.01)
*H04W 74/08* (2009.01)

(58) Field of Classification Search
CPC ......... H04W 48/10; H04W 4/06; H04W 8/24; H04W 72/121; H04W 72/1278; H04L 5/0007; H04L 5/00; H04L 5/0048; H04L 5/0005; H04L 5/0003
See application file for complete search history.

(56) References Cited

U.S. PATENT DOCUMENTS

| | | |
|---|---|---|
| 2015/0365897 A1 | 12/2015 | Hu et al. |
| 2016/0234735 A1* | 8/2016 | Kubota ............... H04W 48/14 |
| 2016/0234736 A1 | 8/2016 | Kubota et al. |
| 2017/0265082 A1 | 9/2017 | Jiang et al. |
| 2018/0206180 A1* | 7/2018 | Agiwal ............... H04W 48/10 |
| 2019/0261255 A1 | 8/2019 | You |
| 2020/0359426 A1* | 11/2020 | Pan ................... H04W 16/14 |

FOREIGN PATENT DOCUMENTS

| | | |
|---|---|---|
| CN | 103338500 A | 10/2013 |
| CN | 105981458 A | 9/2016 |
| CN | 106102182 A | 11/2016 |
| CN | 108024310 A | 5/2018 |
| WO | 2016130353 A2 | 8/2016 |

OTHER PUBLICATIONS

Interdigital Communications, "Request and Acquisition of Other-SI", 3GPP TSG-RAN WG2 Meeting #97, R2-1701195, Feb. 13-17, 2017, 3 Pages, Athens, Greece.

LG Elections Inc., "SI request procedure using MSG3", 3GPP TSG-RAN WG2 Meeting #97bis, R2-1703602, Apr. 3-7, 2017, 2 Pages, Spokane, USA.

Mediatek Inc., "NR SI Request Methods", 3GPP TSG-RAN2#97Bis Meeting, R2-1702788, Apr. 3-7, 2017, 5 Pages, Spokane, US.

Mitsubishi Electric, "WF on Power Ramping Counter of RACH Msg.1 Retransmission", 3GPP TSG RAN WG1 Meeting #88bis, R1-1706613, Apr. 3-7, 2017, 8 Pages, Spokane, USA.

NTT Docomo, Inc., "On-demand SI provisioning request", 3GPP TSG-RAN WG2 #97bis, R2-1703312, Apr. 3-7, 2017, 3 Pages, Spokane, USA.

Qualcomm Incorporated, "Delivery of System Information", 3GPP TSG-RAN WG2 Meeting #97, R2-1701778, (resubmission of R2-1700587), Feb. 13-17, 2017, 4 Pages, Athens, Greece.

Qualcomm Incorporated, "Delivery of System information", 3GPP TSG-RAN WG2 Meeting NR ad-hoc, R2-1700587, Jan. 17-19, 2017, 4 Pages, Spokane, USA.

Samsung, "On Demand SI Delivery: Signaling Aspects", 3GPP TSG-RAN WG2 NR, R2-1700011, Jan. 17-19, 2017, 5 Pages, Spokane, USA.

Huawei, HiSilicon, "Msg1 vs Msg 3 for On-Demand Request" [online], 3GPP TSG-RAN2 Meeting #97bis, R2-1702619, Apr. 3-7, 2017, 4 pages.

ZTE, ZTE Microelectronics, "Further discussion on Other SI" [online], 3GPP TSG-RAN WG2 NR Ad Hoc, R2-1700148, Jan. 17-19, 2017, 5 pages.

MediaTek Inc., "NR SI Unicast" [online], 3GPP TSG-RAN2 #97, R2-1701362, Feb. 13-17, 2017, 7 pages.

* cited by examiner

Network device 110    Terminal device 120

300

A network device receives a first message from a terminal device, where the first message includes first request information used to request first system information SI — S310

The network device sends a second message to the terminal device, where the second message includes information used to respond to the request of the request information — S320

METHOD AND APPARATUS FOR OBTAINING SYSTEM INFORMATION

CROSS-REFERENCE TO RELATED APPLICATIONS

This application is a continuation of International Application No. PCT/CN2018/085535, filed on May 4, 2018 which claims priority to Chinese Patent Application No. 201710313816.3, filed on May 5, 2017. The disclosures of the aforementioned applications are hereby incorporated by reference in their entireties.

TECHNICAL FIELD

This application relates to the communications field, and in particular, to a method and an apparatus for obtaining system information in the wireless communications field.

BACKGROUND

In a wireless communications system, a network device needs to send some key parameters to a terminal device by using system information (SI), to facilitate establishment of a communication connection between the terminal device and the network device.

For example, in a high frequency communications system, due to a high path loss in high frequency communication, a narrow beam is required to ensure a relatively long propagation distance and a relatively high beam gain of a signal. However, a coverage area of the narrow beam is limited. To ensure communication quality, the network device and the terminal device need to align narrow beams, that is, the network device needs to scan a plurality of beams to determine a narrow beam for finally transmitting data.

Therefore, how to improve efficiency of obtaining the SI is a problem that urgently needs to be resolved currently.

SUMMARY

This application provides a method and an apparatus for obtaining SI, to help improve efficiency of obtaining the SI by a terminal device.

According to one aspect, a method for obtaining SI is provided. The method includes: sending, by a terminal device, a first message to a network device, where the first message includes first request information used to request first system information SI; detecting, by the terminal device, a second message and obtaining the first SI, where the second message includes information used to respond to the request of the first request information.

The terminal device may send the first request information to the network device based on an actual requirement, and detect the second message on a preset time-frequency resource. After receiving the first request information, the network device can determine a sending manner of the first SI, for example, broadcast, multicast, or unicast, based on a quantity of terminal devices that currently request the first SI. Therefore, the method for obtaining SI provided in this application helps improve efficiency of obtaining the SI by the terminal device.

Optionally, the sending, by a terminal device, a first message to a network device includes: sending, by the terminal device, the first message to the network device by using a first code domain resource and a first time-frequency resource, where the first code domain resource and the first time-frequency resource are some resources in a physical random access channel PRACH resource set, and the first code domain resource and the first time-frequency resource meet at least one of the following conditions: the first code domain resource is only used to transmit the first message jointly with the first time-frequency resource; and the first time-frequency resource is only used to transmit the first message jointly with the first code domain resource.

Both code domain resources and time-frequency resources of a communications system are limited. In addition to being used to transmit the first message jointly with the first time-frequency resource, the first code domain resource may be used to transmit other messages with remaining time-frequency resources in the PRACH resource set. In addition to being used to transmit the first message jointly with the first code domain resource, the first time-frequency resource may be used to transmit other messages with remaining code domain resources in the PRACH resource set. Therefore, utilization of the PRACH resource set is improved while reliability of obtaining the SI is ensured.

Optionally, the first request information includes a bitmap, a quantity M of bits included in the bitmap is less than or equal to a quantity N of types of SI included in a communications system in which the terminal device is located, the bitmap is used to indicate the first SI, the first SI is SI included in the communications system, and M and N are positive integers.

According to the method for obtaining SI provided in this application, a size of the first request information is fixed, and a size of an occupied resource is also fixed. This helps the network device detect the first request information.

Optionally, the detecting, by the terminal device, a second message and obtaining the first SI includes: obtaining, by the terminal device, second SI from the second message, where the second SI belongs to the first SI, or the second SI includes the first SI, where the first message is a message MSG 1, and the second message is a MSG 2 or a response message in an SI window corresponding to the first SI; the first message is a MSG 1, and the second message is a response message in an SI window corresponding to the first SI; the first message is a MSG 3, and the second message is a MSG 4; or the first message is a MSG 3, and the second message is a response message in an SI window corresponding to the first SI.

After sending the MSG 1, the terminal device may detect the response message and MSI or detect the MSG 2 and MSI in a preset time period. After sending the MSG 3, the terminal device may detect the response message and MSI or detect the MSG 4 and MSI in a preset time period, thereby reducing an SI receiving delay.

Optionally, the detecting, by the terminal device, a second message and obtaining the first SI includes: obtaining, by the terminal device, second SI from the second message, where the second SI belongs to the first SI, or the second SI includes the first SI, where the first message is a message MSG 1, and the second message is a MSG 2 or a response message in a preset time period; or the first message is a MSG 3, and the second message is a MSG 4.

After sending the MSG 1, the terminal device may detect the response message and MSI or detect the MSG 2 and MSI in a preset time period. After sending the MSG 3, the terminal device may detect the response message and MSI or detect the MSG 4 and MSI in a preset time period, thereby reducing an SI receiving delay.

Optionally, the detecting, by the terminal device, a second message and obtaining the first SI includes: obtaining, by the terminal device, third SI from a third message, where the third SI belongs to the first SI, or the third SI includes the first SI, where the first message is a MSG 1, the second message is a MSG 2 and minimum system information MSI, and the third message is a response message received by the terminal device based on scheduling information carried in the MSI; the first message is a MSG 1, the second message is MSI, and the third message is a response message received by the terminal device based on scheduling information carried in the MSI; the first message is a MSG 3, the second message is a MSG 4 and MSI, and the third message is a response message received by the terminal device based on scheduling information carried in the MSI; or the first message is a MSG 3, the second message is MSI, and the third message is a response message received by the terminal device based on scheduling information carried in the MSI.

The terminal device may obtain only a part of the first SI from the second message, or may not obtain the first SI from the second message. Then, the terminal device may receive the response message based on the scheduling information in the MSI. The response message further carries other SI in addition to the first SI, so that flexibility of obtaining the first SI by the terminal device is enhanced.

Optionally, the second message further includes information used to indicate a type of the second SI.

Therefore, the terminal device can identify whether the information carried in the second message is information requested by the terminal device.

Optionally, the method further includes: retransmitting, by the terminal device, the first message to the network device in a first time unit, where the second message is not detected or the second message does not carry the information used to respond to the request of the first request information, the first time unit follows a second time unit, and the second time unit is a time unit in which the terminal device detects the second message.

After the terminal device sends the MSG 1 in the second time unit, if the terminal device does not detect the response message, the MSG 2, and the MSI in the preset time period, the terminal device may retransmit the first message in the first time unit. Alternatively, after the terminal device sends the MSG 3 in the second time unit, if the terminal device does not detect the response message, the MSG 4, and the MSI in the preset time period, the terminal device may retransmit the first message in the first time unit. An interval between the second time unit and the first time unit may be preset, or may be determined based on an indication of the network device, thereby improving the flexibility and reliability of obtaining the SI.

Optionally, the method further includes: receiving, by the terminal device, at least one of backoff indication information and quantity indication information from the network device, where the backoff indication information is used to indicate an interval between the first time unit and the second time unit, and the quantity indication information is used to indicate a maximum quantity of transmission times of a MSG 1.

The network device may indicate a constraint of obtaining the first SI by the terminal device, that is, the maximum quantity of transmission times of the MSG 1. If a quantity of times of transmitting the MSG 1 by the terminal device reaches the maximum quantity of transmission times and the first SI is still not successfully obtained, it indicates that the communications system or a communication environment is abnormal, and the terminal device may suspend obtaining the first SI or may obtain the first SI in another manner, thereby enhancing flexibility and reliability of obtaining the SI, and reducing RACH conflicts.

Optionally, at least one of the backoff indication information and the quantity indication information is carried in the MSI.

Generally, the MSI is periodically sent through broadcast, which helps the terminal device obtain at least one of the backoff indication information and the quantity indication information in time.

Optionally, the method further includes: performing, by the terminal device, cell reselection, where a quantity of times that the first message has been transmitted is equal to a maximum quantity of transmission times of the first message.

When the terminal device meets the constraint condition of obtaining the first SI, the terminal device may perform cell retransmission, for example, may reselect, based on preset information, a cell with a relatively low frequency priority, to meet a basic communication requirement of a user.

According to another aspect, a method for sending system information is provided. The method includes: receiving, by a network device, a first message from a terminal device, where the first message includes first request information used to request first system information SI; and sending, by the network device, a second message to the terminal device, where the second message includes information used to respond to the request of the first request information.

The terminal device may send the first request information to the network device based on an actual requirement, and detect the second message on a preset time-frequency resource. After receiving the first request information, the network device can determine a sending manner of the first SI, for example, broadcast, multicast, or unicast, based on a quantity of terminal devices that currently request the first SI. Therefore, the method for sending SI provided in this application helps improve efficiency of obtaining the SI by the terminal device.

Optionally, the receiving, by a network device, a first message from a terminal device includes: receiving, by the network device, the first message from the terminal device by using a first code domain resource and a first time-frequency resource, where the first code domain resource and the first time-frequency resource are some resources in a physical random access channel PRACH resource set, and the first code domain resource and the first time-frequency resource meet at least one of the following conditions: the first code domain resource is only used to transmit the first message jointly with the first time-frequency resource; and the first time-frequency resource is only used to transmit the first message jointly with the first code domain resource.

Both code domain resources and time-frequency resources in the PRACH resource set are limited. In addition to being used to transmit the first message jointly with the first time-frequency resource, the first code domain resource may be used to transmit other messages with remaining time-frequency resources in the PRACH resource set. In addition to being used to transmit the first message jointly with the first code domain resource, the first time-frequency resource may be used to transmit other messages with remaining code domain resources in the PRACH resource set. Therefore, utilization of the PRACH resource set is improved while reliability of obtaining the SI is ensured.

Optionally, the first request information includes a bitmap, a quantity M of bits included in the bitmap is less than or equal to a quantity N of types of SI included in a communications system in which the terminal device is located, the bitmap is used to indicate the first SI, the first SI is SI included in the communications system, and M and N are positive integers.

A size of the first request information is fixed, and a size of an occupied resource is also fixed. This helps the network device detect the first request information.

Optionally, the second message includes second SI, and the second SI belongs to the first SI, or the second SI includes the first SI, where the first message is a message MSG 1, and the second message is a MSG 2 or a response message in an SI window corresponding to the first SI; the first message is a MSG 1, and the second message is a response message in an SI window corresponding to the first SI; the first message is a MSG 3, and the second message is a MSG 4; or the first message is a MSG 3, and the second message is a response message in an SI window corresponding to the first SI.

Optionally, the second message includes second SI, and the second SI belongs to the first SI, or the second SI includes the first SI, where the first message is a message MSG 1, and the second message is a MSG 2 or a response message in a preset time period; or the first message is a MSG 3, and the second message is a MSG 4.

The network device may directly send a part of or all content of the first SI to the terminal device by using the second message, or the network device may add other SI in addition to the first SI to the second message, thereby improving flexibility of obtaining the first SI by the terminal device.

Optionally, the method further includes: sending, by the network device, a third message to the terminal device, where the third message includes third SI, and the third SI belongs to the first SI, or the third SI includes the first SI, where the first message is a MSG 1, the second message is a MSG 2 or MSI, and the third message is a response message scheduled based on scheduling information carried in the MSI; the first message is a MSG 1, the second message is MSI, and the third message is a response message scheduled based on scheduling information carried in the MSI; the first message is a MSG 3, the second message is a MSG 4 or MSI, and the third message is a response message scheduled based on scheduling information carried in the MSI; or the first message is a MSG 3, the second message is MSI, and the third message is a response message scheduled based on scheduling information carried in the MSI.

The network device may determine, based on an actual situation, SI carried in the second message. For example, when a relatively large quantity of terminal devices request the first SI, the network device may choose to schedule, by using the MSI, a terminal device to receive a broadcast message including the first SI. The first SI is not sent by using another message. When the first SI has a relatively large size, the network device may choose to add a part of the first SI to the MSG 2 or the MSG 4. The remaining part of the first SI may be sent to the terminal device by using the response message scheduled based on the MSI, where the response message further carries other SI in addition to the first SI. Therefore, flexibility of obtaining the first SI by the terminal device is improved.

Optionally, the second message further includes information used to indicate a type of the second SI.

Therefore, the terminal device can identify whether the information carried in the second message is information requested by the terminal device.

Optionally, the method further includes: sending, by the network device, at least one of backoff indication information and quantity indication information to the terminal device, where the backoff indication information is used to indicate an interval at which the terminal device retransmits the first message, and the quantity indication information is used to indicate a maximum quantity of transmission times of a MSG 1.

The network device may indicate a constraint of obtaining the first SI by the terminal device, that is, the maximum quantity of transmission times of the MSG 1. If a quantity of times of transmitting the MSG 1 by the terminal device reaches the maximum quantity of transmission times and the first SI is still not successfully obtained, it indicates that the communications system or a communication environment is abnormal, and the terminal device may suspend obtaining the first SI or may obtain the first SI in another manner, thereby enhancing flexibility and reliability of obtaining the SI.

Optionally, at least one of the backoff indication information and the quantity indication information is carried in the MSI.

Generally, the MSI is periodically sent through broadcast, which helps the terminal device obtain at least one of the backoff indication information and the quantity indication information in time.

According to still another aspect, this application provides an apparatus for obtaining SI. The apparatus can implement functions performed by the terminal device in the method in the foregoing aspect. The functions may be implemented by hardware, or may be implemented by hardware executing corresponding software. The hardware or software includes one or more units or modules corresponding to the functions.

In a possible design, a structure of the apparatus includes a processor and a transceiver. The processor is configured to support the apparatus in performing corresponding functions in the foregoing method. The transceiver is configured to support communication between the apparatus and another network element. The apparatus may further include a memory. The memory is configured to be coupled to the processor, and the memory stores a program instruction and data that are necessary for the apparatus.

According to still another aspect, this application provides an apparatus for sending SI. The apparatus can implement functions performed by the network device in the method in the foregoing aspect. The functions may be implemented by hardware, or may be implemented by hardware executing corresponding software. The hardware or software includes one or more units or modules corresponding to the functions.

In a possible design, a structure of the apparatus includes a processor and a transceiver. The processor is configured to support the apparatus in performing corresponding functions in the foregoing method. The transceiver is configured to support communication between the apparatus and another network element. The apparatus may further include a memory. The memory is configured to be coupled to the processor, and the memory stores a program instruction and data that are necessary for the apparatus.

According to still another aspect, a network system is provided. The network system includes the apparatus for obtaining SI and the apparatus for sending SI in the foregoing aspects.

According to still another aspect, a computer program product is provided. The computer program product includes computer program code, and when the computer program code is run by a communications unit, a processing unit or a transceiver, and a processor of a terminal device, the terminal device is enabled to perform the methods in the foregoing implementations.

According to still another aspect, a computer program product is provided. The computer program product includes computer program code, and when the computer program code is run by a communications unit, a processing unit or a transceiver, and a processor of a terminal device, the terminal device is enabled to perform the methods in the foregoing implementations.

According to still another aspect, this application provides a computer storage medium, configured to store computer software instructions used by the foregoing terminal device. The computer storage medium includes a program designed for performing the foregoing aspects.

According to still another aspect, this application provides a computer storage medium, configured to store computer software instructions used by the foregoing network device. The computer storage medium includes a program designed for performing the foregoing aspects.

According to still another aspect, this application provides a communications chip. The communications chip stores an instruction, and when run on a terminal device, the instruction enables the communications chip to perform the methods in the foregoing aspects.

According to still another aspect, this application provides a communications chip. The communications chip stores an instruction, and when the instruction is run on a network device, the communications chip is enabled to perform the methods in the foregoing aspects.

According to still another aspect, this application provides a method for obtaining SI, including:

One or more RACH resources can be used for an SI request, and only limited preamble sequences and limited RACH resources are reserved for the SI request. It should be avoided that the reserved preamble sequences are used for the SI request on all the RACH resources.

If an SI request is sent but SI sent by a network device is not received, the terminal device continues to detect the requested SI after performing a backoff operation.

A backoff indication for the SI request and a maximum quantity of requests are included in MSI.

If the SI request reaches the maximum quantity of requests, the terminal device marks the requested SI as an SI that cannot be obtained in a cell and continues to camp on the cell, or the terminal device triggers a cell reselection process.

DETAILED DESCRIPTION OF ILLUSTRATIVE EMBODIMENTS

The following describes technical solutions in this application with reference to accompanying drawings.

Figure 1:
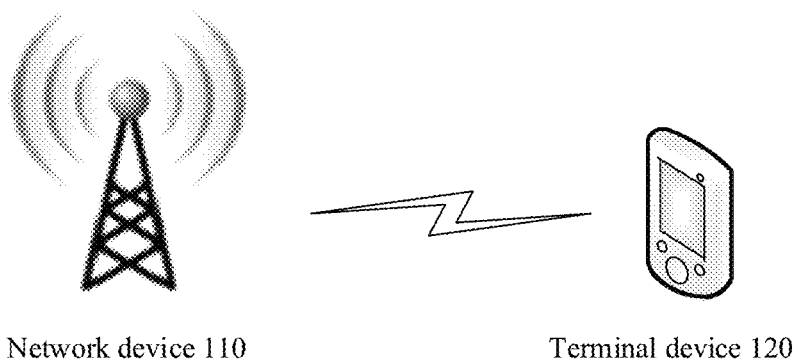
FIG. 1 shows a communications system applicable to this application.

FIG. 1 shows a communications system 100 applicable to this application. The communications system 100 includes a network device 110 and a terminal device 120. The network device 110 and the terminal device 120 communicate with each other over a wireless network. When the terminal device 120 sends data, a wireless communications module may encode information for transmission. Specifically, the wireless communications module may obtain a specific quantity of data bits to be sent to the network device 110 through a channel. These data bits are, for example, data bits generated by a processing module, received from another device, or stored in a storage module. These data bits are, for example, data bits generated by a processing module, received from another device, or stored in a storage module. These data bits may be included in one or more transport blocks (which may also be referred to as information blocks or data blocks), and the transport block may be segmented to generate a plurality of code blocks.

In this application, the terminal device may also be referred to as an access terminal, user equipment (UE), a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a handheld device having a wireless communication function, a computing device or another processing device connected to a wireless modem, an in-vehicle device, a wearable device, and user equipment in a 5th-generation (5G) mobile communications system.

The network device may be a base transceiver station (BTS) in a code division multiple access (CDMA) system, a NodeB (NB) in a wideband code division multiple access (WCDMA) system, an evolved NodeB (eNB) in a long term evolution (LTE) system, or a gNB (gNB) in a 5G mobile communications system. The foregoing base stations are used as examples only for description. Alternatively, the network device may be a relay node, an access point, an in-vehicle device, a wearable device, or another type of device.

The foregoing communications system applicable to this application is used as an example only for description, and the communications system applicable to this application is not limited thereto. For example, the communications system may include another quantity of network devices and terminal devices.

For ease of understanding of this application, before a method for sending feedback information provided in this application is described, concepts in this application are briefly described first.

SI in the communications system may be organized by using system information blocks (SIB). Each SIB integrates related parameters of a function. For example, a current communications system has a total of three pieces of SI, a, b, and c, and a base station may use a to form one SIB and send the SIB to UE, or a base station may use a and b to form one SIB and send the SIB to UE, or a base station may use a, b, and c to form one SIB and send the SIB to UE. In an LTE system, there are several types of SIBs: (1) a master information block (MIB): basic parameters required when the UE initially accesses a network; (2) a SIB 1: parameters related to cell access and cell selection, and time domain scheduling information of other SIBs; (3) a SIB 2: public radio resource configuration information; (4) a SIB 3 to a SIB 8: parameters used to control intra-frequency, inter-frequency, and inter radio access technology (inter random access technology, Inter-RAT) cell reselection; (5) a SIB 9: a home NodeB name; (6) a SIB 10 to a SIB 12: an earthquake and tsunami warning message, and the like. The MIB is carried in a physical broadcast channel (PBCH), and a transmission period is fixed to 40 milliseconds (ms). The SIB 1 is carried in a physical downlink shared channel (PDSCH), and a transmission period is fixed to 80 ms. Other SIBs are included in an SI message and transmitted by scheduling. Each SI message may include one or more SIBs, an SI message is carried in a PDSCH, and a transmission period is configurable.

In a 5G mobile communications system, to save system resources, some most basic and most important SI used by UE to access a network is referred to as minimum system information (MSI), the MSI is sent in a periodic broadcast message, and remaining SI is used as other system information (OSI) and sent on demand. Sending of some OSI is triggered by a network device; some OSI is sent by a network device as requested by the UE, and the OSI is OSI sent on demand.

UE in a connected state may send an OSI obtaining request by using specific signaling (for example, radio resource control (RRC) signaling or control signaling), and UE in an idle state or an inactive state needs to send an OSI obtaining request by using a message (MSG) 1 or a MSG 3 in a random access process.

The following describes in detail a method for obtaining SI provided in this application.

Figure 2:
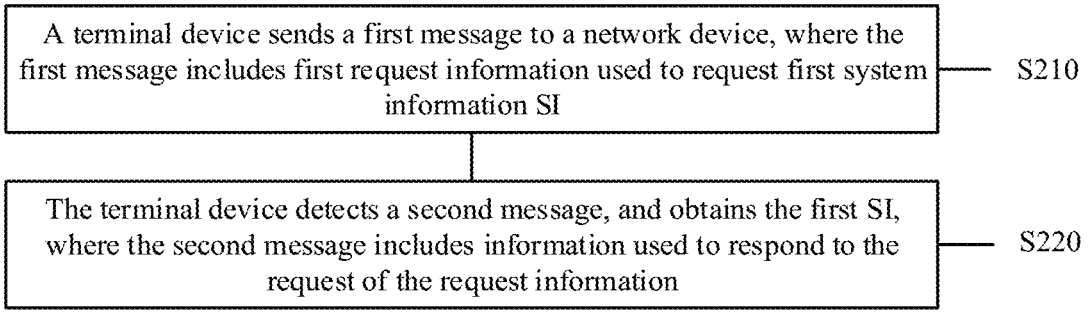
FIG. 2 is a schematic diagram of a method for obtaining SI according to this application.

FIG. 2 is a schematic diagram of a method for obtaining SI according to this application. The method 200 includes the following processes.

S210. A terminal device sends a first message to a network device, where the first message includes first request information used to request first system information (SI).

S220. The terminal device detects a second message and obtains the first SI, where the second message includes information used to respond to the request of the first request information.

For ease of understanding this application, the following describes the technical solutions of this application in detail by using an example in which the terminal device is UE and the network device is a base station.

In S210, the first message is any message that carries the first request information. Neither a name nor a sending manner of the first message is limited in this application.

The first SI is SI required by the UE. The UE may first detect MSI, and determine, based on scheduling information carried in the MSI, whether a broadcast message carries the first SI. The scheduling information is used to indicate OSI scheduled by the MSI. If the UE determines that the base station does not schedule the first SI, the UE sends the first request information to the base station. In some emergent cases, for example, in an ultra-reliable low-latency communication (URLLC) scenario, to reduce latency as much as possible, the UE may directly send the first request information to the base station without waiting for a broadcast message of the base station.

The UE may send the first request information to the base station based on an actual requirement, and detect the second message on a preset time-frequency resource. After receiving the first request information, the base station can determine a sending manner of the first SI, for example, broadcast, multicast, or unicast, based on a quantity of terminal devices that currently request the first SI. Therefore, the method for obtaining SI provided in this application helps improve efficiency of obtaining the SI by the UE.

Optionally, the sending, by a terminal device, a first message to a network device includes the following process.

S211. The terminal device sends the first message to the network device by using a first code domain resource and a first time-frequency resource, where the first code domain resource and the first time-frequency resource are some resources in a physical random access channel (PRACH) resource set, and the first code domain resource and the first time-frequency resource meet at least one of the following conditions: the first code domain resource is only used to transmit the first message jointly with the first time-frequency resource; and the first time-frequency resource is only used to transmit the first message jointly with the first code domain resource.

A quantity of preamble sequences (a preamble, namely, a random access code domain resource) specified in a system is limited, and PRACH time-frequency resources are also limited. Therefore, if a group of preamble sequences are used to send the first request information on all the PRACH time-frequency resources, a quantity of preamble sequences used for random access is reduced accordingly, resulting in an increase in a probability of random access channel conflicts (RACH). According to the method for obtaining SI provided in this application, in addition to being used to transmit the first message jointly with the first time-frequency resource, the first code domain resource may be used to initiate a RACH with remaining time-frequency resources in the PRACH resource set. In addition to being used to transmit the first message jointly with the first code domain resource, the first time-frequency resource may be used to initiate a RACH with remaining code domain resources in the PRACH resource set. Therefore, utilization of the PRACH resource set is improved while reliability of obtaining the SI is ensured.

Figure 3:
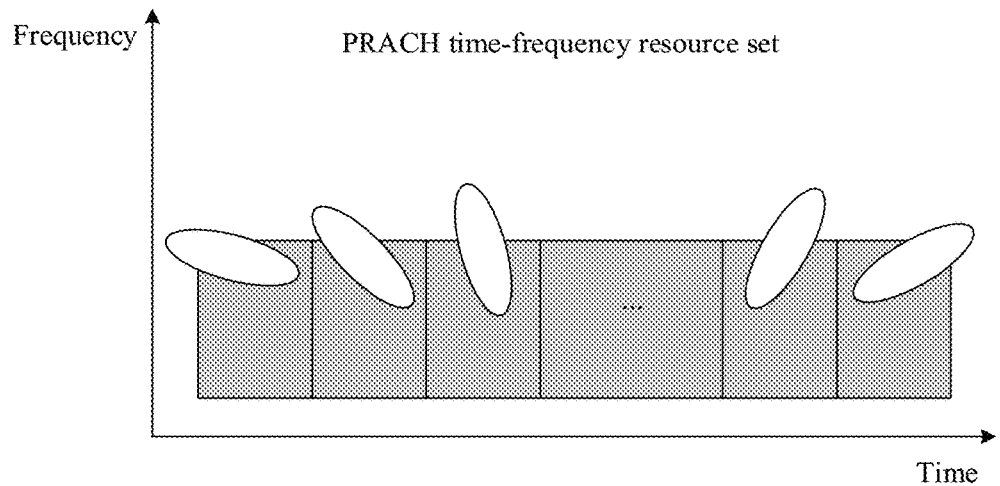
FIG. 3 is a schematic diagram of a PRACH resource according to this application.

FIG. 3 shows a PRACH resource set. The PRACH resource set includes a plurality of orthogonal frequency division multiplexing (OFDM) symbols, and each OFDM symbol may be received by using one or more beams. A PRACH is an uplink resource, and a base station receives, by uplink beam scanning, MSGs 1 sent by UEs in different directions. Different beams correspond to different antenna ports, and a round of beam scanning covering an entire cell is referred to as a PRACH resource set.

In a communications protocol, a group of preamble sequences may be predefined as dedicated preamble sequences for transmitting an SI request, and some time-frequency resources in a PRACH resource set are selected as dedicated time-frequency resources for transmitting the SI request. For example, some or all time-frequency resources in the PRACH resource set may be selected, and an SI request period may be an integer multiple of a RACH period. The dedicated preamble sequence is used to send an SI obtaining request on the dedicated time-frequency resource. Another preamble sequence may be used to initiate a RACH on the dedicated time-frequency resource. All preamble sequences may be used to initiate a RACH on the dedicated time-frequency resource.

Figure 4:
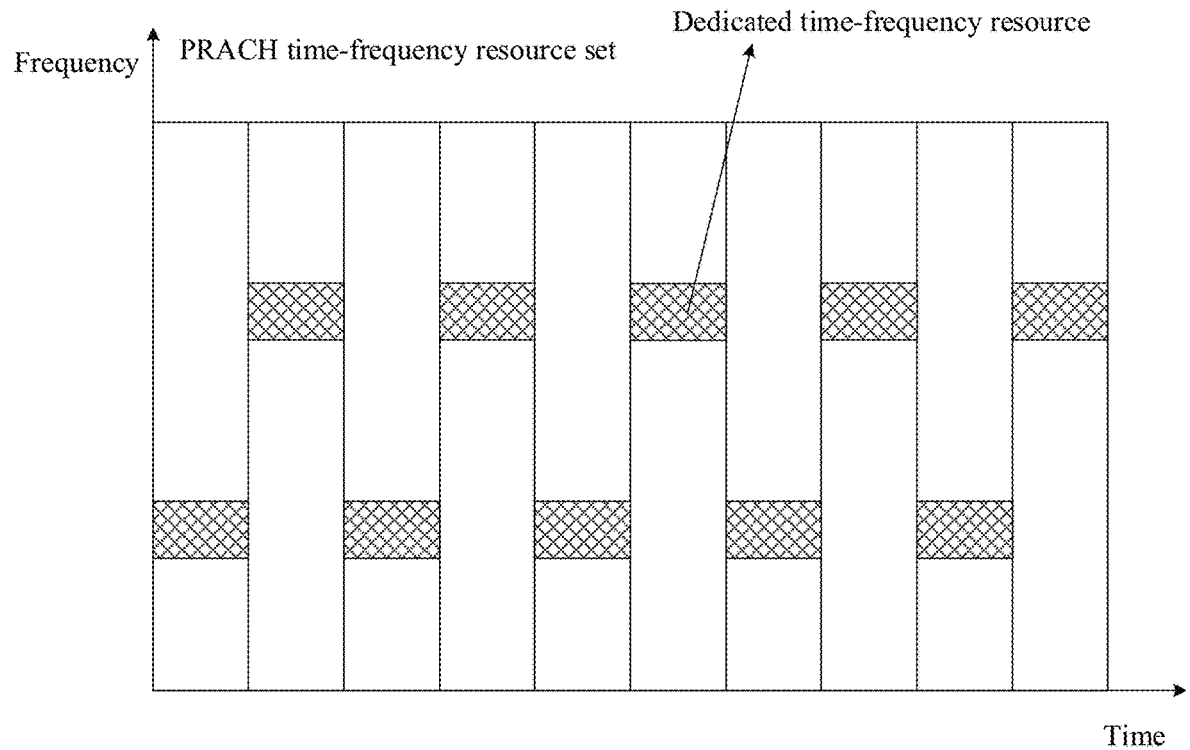
FIG. 4 is a schematic diagram of a centralized mapping manner of PRACH resources according to this application.

FIG. 4 is a schematic diagram of a mapping manner of dedicated preamble sequences. As shown in FIG. 4, all dedicated preamble sequences are mapped to a continuous time-frequency resource. For example, preamble sequences 1 to 20 are dedicated preamble sequences, and are mapped to a time-frequency resource block shown in FIG. 4. In this mapping manner, preamble sequences corresponding to all SIB requests or SI requests are sent on a same PRACH time-frequency resource, and a delay is relatively low. However, a conflict may occur because a large quantity of SI requests is simultaneously sent.

Figure 5:
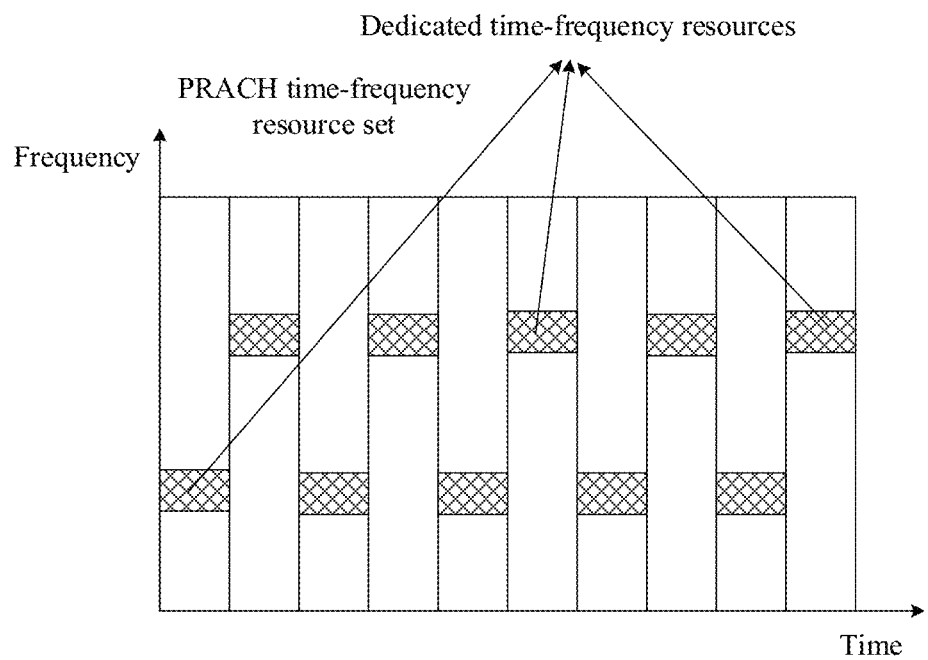
FIG. 5 is a schematic diagram of a discrete mapping manner of PRACH resources according to this application.

FIG. 5 is a schematic diagram of another mapping manner of dedicated preamble sequences. As shown in FIG. 5, dedicated preamble sequences are mapped to discrete time-frequency resources. In this mapping manner, preamble sequences corresponding to different SIB requests or SI requests are discretely mapped to different PRACH time-frequency resources. This avoids a possible conflict caused by simultaneous sending of a large quantity of SI requests. However, to send a preamble sequence corresponding to each SIB request or SI request, waiting for a corresponding PRACH time-frequency resource is needed, and consequently, a delay of the SI request may be increased.

Optionally, the first request information includes a bitmap, a quantity M of bits included in the bitmap is less than or equal to a quantity N of types of SI included in a communications system in which the terminal device is located. The bitmap is used to indicate the first SI, the first SI is SI included in the communications system, and M and N are positive integers.

First SI request information may be information agreed on by UE and a base station. For example, a bit "10" represents a type of SI, and a bit "001" represents another type of SI. Alternatively, the first SI request information may be in a form of a bitmap (bitmap). For example, if a communications system in which the UE is located has a total of M types of SI, the bitmap may include N bits, where the N bits correspond to an amount of all or some OSI. Alternatively, the bitmap may include M bits, and the M bits correspond to a quantity of types of all SI included in the communications system in which the UE is located.

Figure 6:
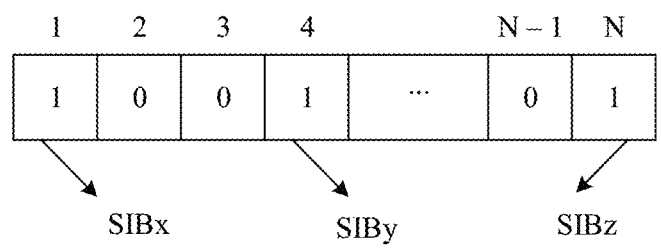
FIG. 6 is a schematic diagram of a bitmap according to this application.

As shown in FIG. 6, the bitmap includes N bits, each small block represents a bit, each bit has two states: "1" and "0", and each bit corresponds to one piece of SI. When the bit is "1", it indicates that the UE requests the SI; or when the bit is "0", it indicates that the UE does not need the SI. The bitmap shown in FIG. 6 indicates that the UE requests to obtain a SIBx, a SIBy, and a SIBz.

According to the method for obtaining SI provided in this application, a size of the first request information is fixed, and a size of an occupied resource is also fixed. This helps the network device detect the first request information.

Optionally, the detecting, by the terminal device, a second message and obtaining the first SI includes the following process.

S221. The terminal device obtains second SI from the second message, where the second SI belongs to the first SI, or the second SI includes the first SI, where the first message is a message MSG 1, and the second message is a MSG 2 or a response message in a preset time period; or the first message is a MSG 3, and the second message is a MSG 4.

After sending the MSG 1, the terminal device may detect, in a preset time period, a response message and a response message in an SI window indicated by scheduling information in MSI, or detect the MSG 2 and a response message in an SI window indicated by scheduling information in MSI. After sending the MSG 3, the terminal device may detect, in a preset time period, a response message and a response message in an SI window indicated by scheduling information in MSI, or detect the MSG 4 and a response message in an SI window indicated by scheduling information in MSI, thereby reducing a delay of receiving the SI. The network device may directly send a part of or all content of the first SI to the terminal device by using the second message, or the network device may add other SI in addition to the first SI to the second message, thereby improving flexibility of obtaining the first SI by the terminal device.

For example, after sending the first message, the UE may listen to a physical downlink control channel (PDCCH) in a response window (namely, the preset time period), and expect to obtain the response message in the SI window indicated by the scheduling information in the MSI. The response window may be a period of time that has a preset relationship with a time-frequency resource occupied by the first message, for example, a period of time that is spaced by m (where m is a positive integer) subframes or slots after the first message is sent. Both a value of m and a time length of the response window may be specified in a communications protocol, or may be configured by the base station.

Figure 7:
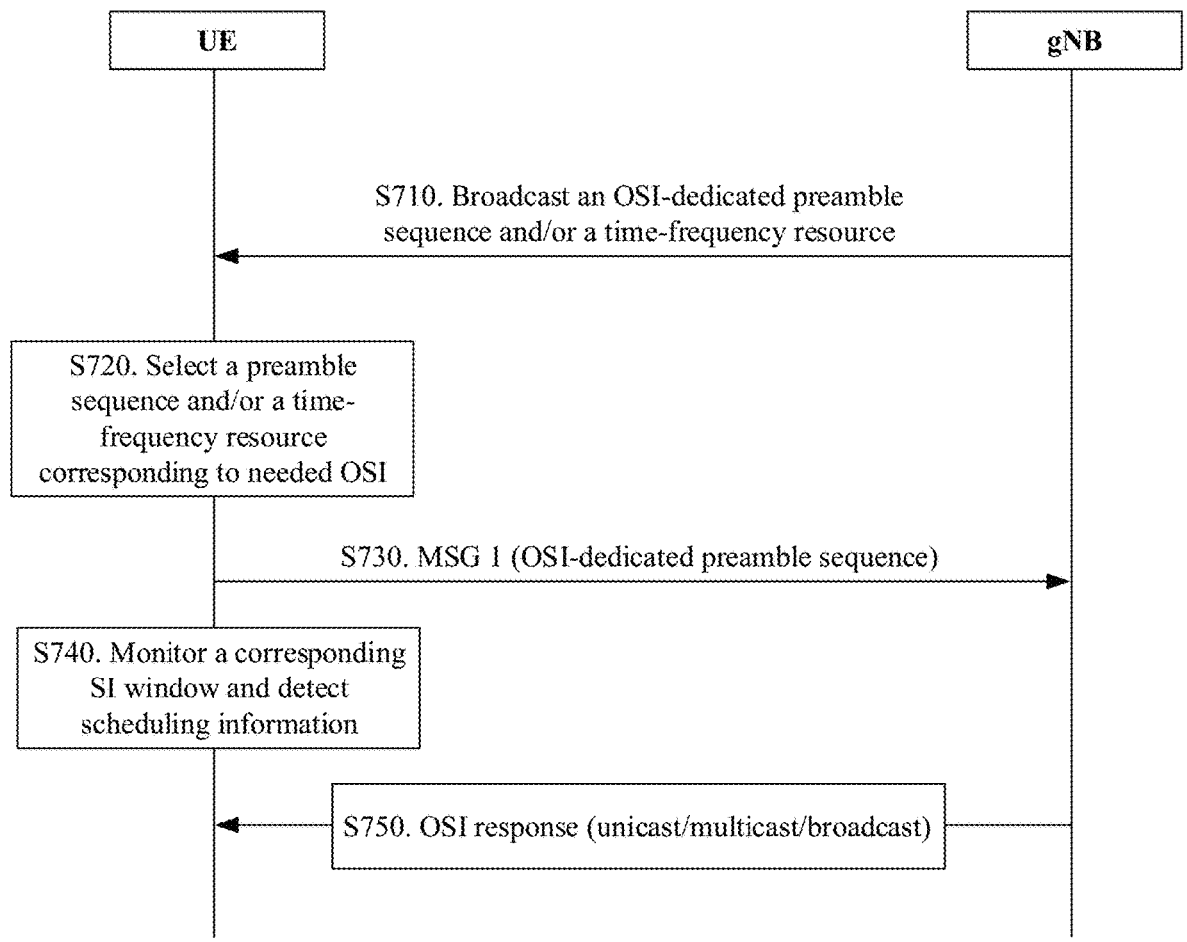
FIG. 7 is a schematic diagram of another method for obtaining SI according to this application.

FIG. 7 is a schematic flowchart of another method for obtaining SI according to this application.

S710. If a base station (gNB) determines that some SIBs corresponding to OSI sent on demand need to be requested by using a MSG 1, the base station notifies UE of preamble sequences (namely, dedicated preamble sequences) corresponding to the SIBs and/or time-frequency resources in a PRACH resource set by using MSI, where each dedicated preamble sequence corresponds to one or more SIBs corresponding to the OSI.

S720. When the UE needs to obtain some SIBs corresponding to the OSI, the UE may first read scheduling information that is for the OSI and that is in the MSI, and determine whether the OSI is being broadcast; and if the scheduling information in the MSI indicates that the SIB is being broadcast, the UE directly reads, based on the scheduling information, the SIB that is being broadcast; or if the scheduling information in the MSI indicates that the SIB is not being broadcast, the UE determines whether a preamble sequence and/or a PRACH time-frequency resource corresponding to the SIB is included in the MSI.

S730. If the preamble sequence and/or the PRACH time-frequency resource corresponding to the SIB is included in the MSI, the UE sends first request information to the base station by using the corresponding preamble sequence and/or PRACH time-frequency resource, where the first request information is carried in the MSG 1.

S740. After sending the first request information by using the MSG 1, the UE needs to listen on a PDCCH in a corresponding response window, and detect, based on the scheduling information that is for the OSI and that is in the MSI, the requested SIB carried in a corresponding SI window. If the base station sends the first SI through broadcast and adds the scheduling information of the first SI to the MSI and sends the MSI to the UE, the UE detects and reads the first SI in the corresponding SI window based on the read scheduling information; and if the base station sends the first SI through unicast or multicast, the UE detects the first SI in the corresponding response window.

S750. After receiving the first request information sent by the UE, the base station determines whether to send the requested SI to the UE through broadcast, unicast, or multicast. When the base station simultaneously receives requests for the first SI (that is, the OSI) from a plurality of UEs in different directions, the base station may choose to send the SIB corresponding to the first SI through broadcast in the SI window. If the base station receives only a request that is for the first SI and that is sent by a specific UE, the base station may choose to send the SIB corresponding to the first SI through unicast or multicast.

The first SI may be carried in a PDSCH, and scheduled by a PDCCH (which indicates a time-frequency resource position). The PDCCH may be scrambled by using an SI-RNTI. In this case, the UE blindly detects, in a corresponding response window, the PDCCH scrambled by using the system information-radio network temporary identifier (SI-RNTI), to obtain corresponding first SI. Different OSI may correspond to different SI-RNTIs, so that the UE identifies requested OSI. Alternatively, all OSI corresponds to a same SI-RNTI, and information indicating a type of the first SI, that is, indicating which piece of SI or which pieces of SI the first SI is, may be carried in a message carrying the first SI. The information may be a media access control (MAC) control element (CE).

Figure 8:
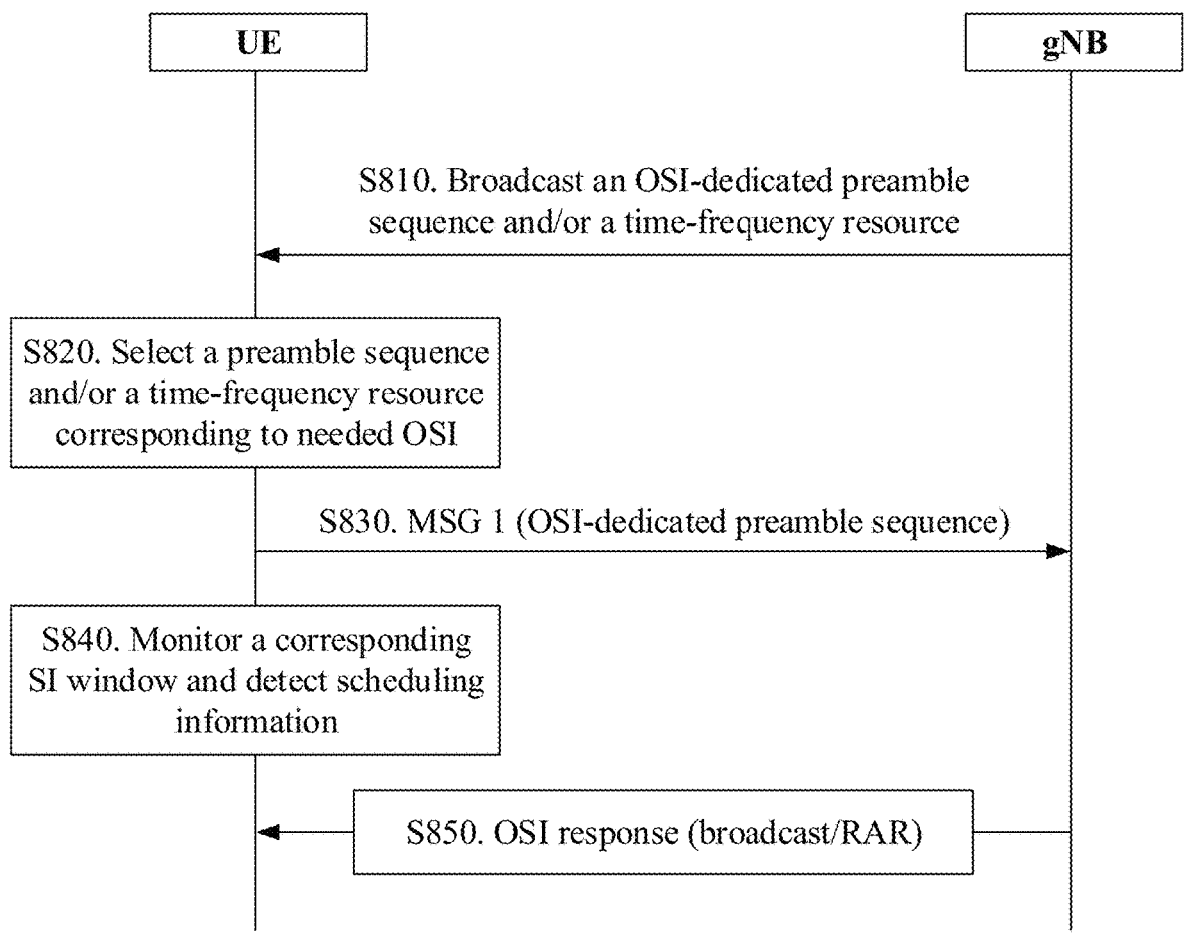
FIG. 8 is a schematic diagram of still another method for obtaining SI according to this application.

FIG. 8 is a schematic flowchart of still another method for obtaining SI according to this application.

In FIG. 8, S810 to S840 are the same as S710 to S740 in FIG. 7, and details are not described herein again.

In S850, after receiving an SI obtaining request sent by the UE, the base station determines whether to send requested SI to the UE through broadcast, unicast, or multicast. When the base station simultaneously receives SI requests that are for a same SIB and that are from a plurality of UEs in different directions, the base station may choose to send the SIB in a corresponding SI window through broadcast, and add scheduling information of the SIB in MSI. If the base station receives SI requests that are for a pair of same SIBs and that are sent by only several UEs, the base station may choose to send the requested SIB through unicast or multicast. In this case, the base station may directly add the SIB to a random access response (RAR) and send the RAR to the UE, and may also add the scheduling information of the SIB to the RAR and send the RAR to the UE, so that the UE receives the requested SIB at a corresponding time-frequency resource position. The scheduling information of the SIB may include a type of the SIB requested by the UE, valid information (value tag/Index), a period, and SI window information (an SI window time length, a resource start position, and the like). After receiving the SI obtaining request sent by the UE, regardless of whether broadcast, unicast, or multicast is selected, the base station may add an acknowledgment (ACK) to the RAR, to indicate that the SI request of the UE has been successfully received. Therefore, after sending the SI obtaining request by using the MSG 1, the UE needs to detect the requested SIB carried in the SI window indicated by the scheduling information in the MSI. In this process, the RAR may be carried in a PDSCH in a 5G communications system and scheduled by a PDCCH. The PDCCH may be scrambled by using a random access-radio network temporary identifier (RA-RNTI) in a same manner as that used in the LTE system. Different from the RAR in the LTE system, the RAR in the method 800 includes different message content. The content included in the RAR in the method 800 includes: at least one of information such as a preamble sequence identifier (preamble id), a SIB message, a SIB type indication (that is, indicating SIB types), SIB scheduling information, and an ACK indicating that an SI request has been successfully received.

Optionally, the detecting, by the terminal device, a second message and obtaining the first SI includes the following process.

S222. The terminal device obtains third SI from a third message, where the third SI belongs to the first SI, or the third SI includes the first SI, where the first message is a MSG 1, the second message is a MSG 2 and minimum system information MSI, and the third message is a response message received by the terminal device based on scheduling information carried in the MSI; the first message is a MSG 1, the second message is MSI, and the third message is a response message received by the terminal device based on scheduling information carried in the MSI; the first message is a MSG 3, the second message is a MSG 4 and MSI, and the third message is a response message received by the terminal device based on scheduling information carried in the MSI; or the first message is a MSG 3, the second message is MSI, and the third message is a response message received by the terminal device based on scheduling information carried in the MSI.

The terminal device may obtain only a part of the first SI from the second message, or may not obtain the first SI from the second message. Then, the terminal device may receive the response message based on the scheduling information in the MSI. The response message further carries other SI in addition to the first SI, so that flexibility of obtaining the first SI by the terminal device is enhanced.

Figure 9:
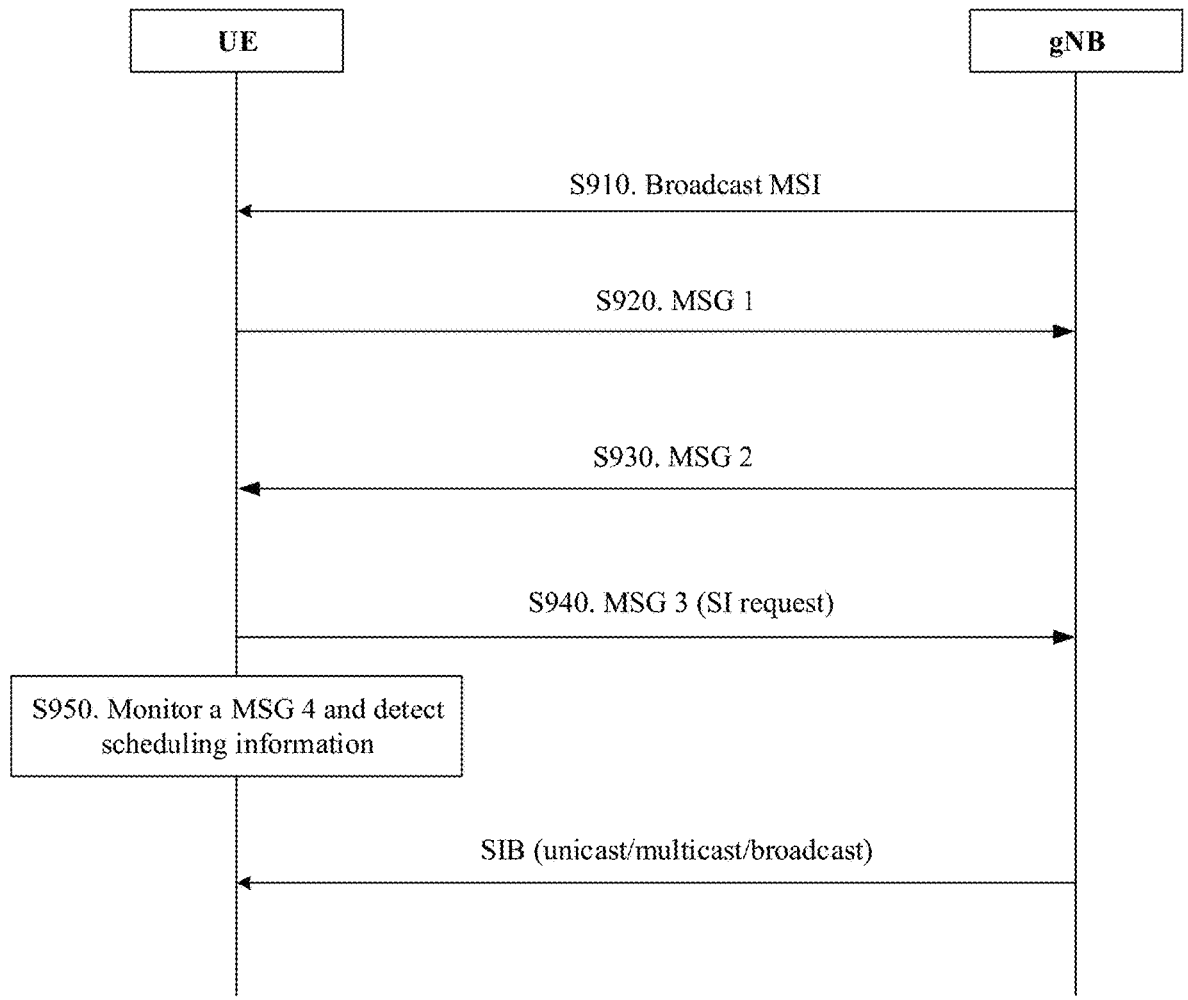
FIG. 9 is a schematic diagram of still another method for obtaining SI according to this application.

FIG. 9 is a schematic flowchart of still another method for obtaining SI according to this application.

In FIG. 9, S910 is the same as S710 in FIG. 7, and details are not described herein again.

S920: If the preamble sequence (namely, the dedicated preamble sequence) and/or the PRACH time-frequency resource (namely, the dedicated time-frequency resource) corresponding to the SIB requested by the UE is not included in the MSI, or the preamble sequence and/or the PRACH time-frequency resource corresponding to the SIB requested by the UE is not fully included in the MSI, the UE chooses to send the MSG 1 by using the preamble sequence and the PRACH time-frequency resource that are used for random access.

S930. The UE receives a MSG 2 (RAR), and if the MSG 2 includes an identifier of a preamble sequence sent by the UE, the UE considers that the RAR is successfully received.

S940. The UE sends an SI request by using a MSG 3, where information included in the MSG includes: a UE identifier (a temporary identifier), an SI request (including a type of the requested SIB), and the SI request may be, for example, in a form of a bitmap.

S950. After sending an SI obtaining request by using the MSG 3, the UE needs to detect the requested SIB carried in an SI window indicated by scheduling information in the MSI, and receive a MSG 4. If the base station determines to send, through multicast or unicast, the SIB requested by the UE, the SIB requested by the UE is sent by using the MSG 4. Sometimes, the UE requests many SIBs, and the MSG 4 cannot carry all SIBs in one downlink transport block. Therefore, the base station adds, to the MSG 4, indication information used to indicate that remaining SIBs not sent need to be further scheduled. After the UE receives the indication information in the MSG 4, the UE may continue to detect a PDCCH of a subsequent subframe (or slot) after receiving the MSG 4. A time period for detecting the PDCCH may be preset, and the UE may stop receiving after completing receiving the remaining SIBs in the time period. If the base station determines to send, through broadcast, the SIB requested by the UE, the UE reads the broadcast SIB based on the scheduling information in the MSI.

Optionally, the second message further includes information used to indicate a type of the second SI.

Therefore, the terminal device can identify whether the information carried in the second message is information requested by the terminal device.

Optionally, the method 200 further includes the following process:

S230. The terminal device retransmits the first message to the network device in a first time unit, where the second message is not detected or the second message does not carry the information used to respond to the request of the first request information, the first time unit follows a second time unit, and the second time unit is a time unit in which the terminal device detects the second message.

After sending the MSG 1 in the second time unit, if the UE does not detect the response message or the MSI in the preset time period, or does not detect the MSG 2 or the MSI in the preset time period; or after sending the MSG 3 in the second time unit, if the UE does not detect the response message or the MSI in the preset time period, or does not detect the MSG 4 or the MSI in the preset time period, the UE may retransmit the first message in the first time unit. An interval between the second time unit and the first time unit may be preset, or may be determined based on an indication of the base station, thereby improving flexibility and reliability of obtaining the SI.

Optionally, the method 200 further includes the following process:

S240. The terminal device receives at least one of backoff indication information and quantity indication information from the network device, where the backoff indication information is used to indicate an interval between the first time unit and the second time unit, and the quantity indication information is used to indicate a maximum quantity of transmission times of a MSG 1.

The base station may indicate a constraint of obtaining the first SI by the UE, that is, the maximum quantity of transmission times of the MSG 1. If a quantity of times of transmitting the MSG 1 by the UE reaches the maximum quantity of transmission times and the first SI is still not successfully obtained, it indicates that the communications system or a communication environment is abnormal, and the terminal device may suspend obtaining the first SI or may obtain the first SI in another manner, thereby improving flexibility and reliability of obtaining the SI, and reducing RACH conflicts.

For example, if the UE neither detects the requested SIB in a corresponding response window after sending the MSG 1, nor reads the requested SIB in the SI window indicated by the scheduling information in the MSI, the UE may perform a backoff operation, and retransmit the MSG 1 after the backoff time expires. An indication of the backoff indication information may be a number, a sequence number, or an index number of the backoff time, and a correspondence between the backoff indication information and the backoff time may be predefined in a communications protocol.

A backoff time for an SI request may be the same as a backoff time for a RACH, or may be different from a backoff time for a RACH.

The maximum quantity of times of requesting the first SI by using the MSG 1 may be a maximum quantity of times of requests sent by the UE by using a same uplink transmit beam, or may be a maximum quantity of uplink transmit beams that are used by the UE for performing a request. The maximum quantity of times of requesting the first SI by using the MSG 1 needs to meet at least one of the foregoing two conditions.

In addition, the UE may determine the backoff time and the maximum quantity of transmission times of the MSG 1 based on preset information, where the preset information may be configured by the base station, or may be predefined in the communications protocol.

Optionally, at least one of the backoff indication information and the quantity indication information is carried in the MSI.

Generally, the MSI is periodically sent through broadcast. This helps the terminal device obtain at least one of the backoff indication information and the quantity indication information in time.

At least one of the backoff indication information and the quantity indication information may alternatively be carried in an RAR in a different application scenario.

Both specific forms and sending manners of the backoff indication information and the quantity indication information are not limited in this application.

Optionally, the method 200 further includes the following process:

S250. The terminal device performs cell reselection, where a quantity of times that the first message has been transmitted is equal to the maximum quantity of transmission times of the first message.

When the terminal device meets the constraint of obtaining the first SI, the terminal device may perform cell retransmission, for example, may reselect, based on preset information, a cell with a relatively low frequency priority, to meet a basic communication requirement of a user.

The foregoing describes the method for obtaining SI provided in this application from a perspective of the terminal device. With reference to the accompanying drawings, the following describes a method for sending SI provided in this application from a perspective of a network device.

Figures 10, 11:
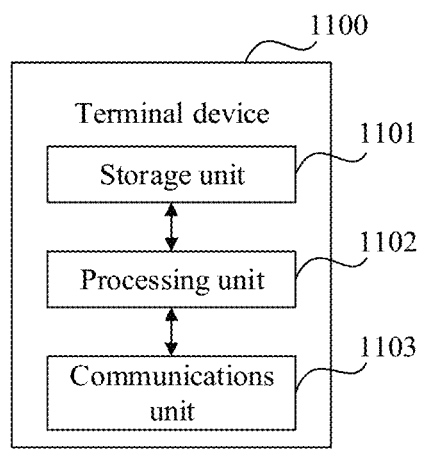
FIG. 10 is a schematic diagram of a method for sending SI according to this application.
FIG. 11 is a schematic diagram of a possible terminal device according to this application.

FIG. 10 is a schematic diagram of a method 300 for sending system information according to this application. The method 300 includes the following processes:

S310. A network device receives a first message from a terminal device, where the first message includes first request information used to request first system information SI.

S320. The network device sends a second message to the terminal device, where the second message includes information used to respond to the request of the first request information.

A person skilled in the art may clearly understand that in the method 300, both the network device and the terminal device may be equivalent to the network device and the terminal device in the method 200, and actions of the network device and the terminal device correspond to actions of the access network device and the terminal device in the method 200. For brevity, details are not described herein.

Therefore, according to the method for sending SI provided in this application, the terminal device may send the first request information to the network device based on an actual requirement, and detect the second message on a preset time-frequency resource. After receiving the first request information, the network device can determine a sending manner of the first SI, for example, broadcast, multicast, or unicast, based on a quantity of terminal devices that currently request the first SI. Therefore, the method for sending SI provided in this application helps improve efficiency of obtaining the SI by the terminal device.

Optionally, the receiving, by a network device, a first message from a terminal device includes the following process.

S311. The network device receives the first message from the terminal device by using a first code domain resource and a first time-frequency resource, where the first code domain resource and the first time-frequency resource are some resources in a physical random access channel PRACH resource set, and the first code domain resource and the first time-frequency resource meet at least one of the following conditions: the first code domain resource is only used to transmit the first message jointly with the first time-frequency resource; and the first time-frequency resource is only used to transmit the first message jointly with the first code domain resource.

Both code domain resources and time-frequency resources in the PRACH resource set are limited. In addition to being used to transmit the first message jointly with the first time-frequency resource, the first code domain resource may be used to transmit other messages with remaining time-frequency resources in the PRACH resource set. In addition to being used to transmit the first message jointly with the first code domain resource, the first time-frequency resource may be used to transmit other messages with remaining code domain resources in the PRACH resource set. Therefore, utilization of the PRACH resource set is improved while reliability of obtaining the SI is ensured.

Optionally, the first request information includes a bitmap, a quantity M of bits included in the bitmap is less than or equal to a quantity N of types of SI included in a communications system in which the network device is located, the bitmap is used to indicate the first SI, the first SI is SI included in the communications system, and M and N are positive integers.

A size of the first request information is fixed, and a size of an occupied resource is also fixed. This helps the network device detect the first request information.

Optionally, the second message includes second SI, and the second SI belongs to the first SI, or the second SI includes the first SI, where the first message is a message MSG 1, and the second message is a MSG 2 or a response message in a preset time period; or the first message is a MSG 3, and the second message is a MSG 4.

The network device may directly send a part of or all content of the first SI to the terminal device by using the second message, or the network device may add other SI in addition to the first SI to the second message, thereby improving flexibility of obtaining the first SI by the terminal device.

Optionally, the method 300 further includes the following process.

S330. The network device sends a third message to the terminal device, where the third message SI includes third SI, and the third SI belongs to the first SI, or the third SI includes the first SI, where the first message is a MSG 1, the second message is a MSG 2 or MSI, and the third message is a response message scheduled based on scheduling information carried in the MSI; the first message is a MSG 1, the second message is MSI, and the third message is a response message scheduled based on scheduling information carried in the MSI; the first message is a MSG 3, the second message is a MSG 4 or MSI, and the third message is a response message scheduled based on scheduling information carried in the MSI; or the first message is a MSG 3, the second message is MSI, and the third message is a response message scheduled based on scheduling information carried in the MSI.

The network device may determine, based on an actual situation, SI carried in the second message. For example, when a relatively large quantity of terminal devices request the first SI, the network device may choose to schedule, by using the MSI, a terminal device to receive a broadcast message including the first SI. The first SI is not sent by using another message. When the first SI has a relatively large size, the network device may choose to add a part of the first SI to the MSG 2 or the MSG 4. The remaining part of the first SI may be sent to the terminal device by using the response message scheduled by the MSI, where the response message further carries other SI in addition to the first SI. Therefore, flexibility of obtaining the first SI by the terminal device is improved.

Optionally, the second message further includes information used to indicate a type of the second SI.

Therefore, the terminal device can identify whether the information carried in the second message is information requested by the terminal device.

Optionally, the method 300 further includes the following process.

S340. The network device sends at least one of backoff indication information and quantity indication information to the terminal device, where the backoff indication information is used to indicate an interval at which the terminal device retransmits the first message, and the quantity indication information is used to indicate a maximum quantity of transmission times of a MSG 1.

The network device may indicate a constraint of obtaining the first SI by the terminal device, that is, the maximum quantity of transmission times of the MSG 1. If a quantity of times of transmitting the MSG 1 by the terminal device reaches the maximum quantity of transmission times and the first SI is still not successfully obtained, it indicates that the communications system or a communication environment is abnormal, and the terminal device may suspend obtaining the first SI or may obtain the first SI in another manner, thereby enhancing flexibility and reliability of obtaining the SI.

Optionally, at least one of the backoff indication information and the quantity indication information is carried in the MSI.

Generally, the MSI is periodically sent through broadcast, which helps the terminal device obtain at least one of the backoff indication information and the quantity indication information in time.

The foregoing describes in detail examples of the resource obtaining method according to this application. It can be understood that, to implement the foregoing functions, both the terminal device and the network device include a corresponding hardware structure and/or software module for performing each function. A person skilled in the art should easily be aware that, in combination with the examples described in the embodiments disclosed in this specification, units and algorithm processes may be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In this application, the terminal device and the like may be divided into functional units based on the foregoing method examples. For example, each function unit may be obtained through division based on a corresponding function, or two or more functions may be integrated into one processing unit. The integrated unit may be implemented in a form of hardware, or may be implemented in a form of a software functional unit. It should be noted that the unit division in this application is an example, and is merely logical function division. There may be another division manner during actual implementation.

FIG. 11 is a possible schematic structural diagram of the terminal device in the foregoing embodiments in a case in which an integrated unit is used. A terminal device 1100 includes: a processing unit 1102 and a communications unit 1103. The processing unit 1102 is configured to control and manage an action of the terminal device 1100. For example, the processing unit 1102 is configured to support the terminal device 1100 in performing S220 in FIG. 2 and/or another process of the technology described in this specification. The communications unit 1103 is configured to support the terminal device 1100 in communicating with another network entity, for example, communicating with a network device. The terminal device 1100 may further include a storage unit 1101, configured to store program code and data of the terminal device 1100.

The processing unit 1102 may be a processor or a controller, for example, may be a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processing module 1102 may implement or execute various example logical blocks, modules, and circuits described with reference to content disclosed in this application. Alternatively, the processor may be a combination for implementing a computing function, for example, a combination of one or more microprocessors or a combination of a DSP and a microprocessor. The communications unit 1103 may be a transceiver, a transceiver circuit, or the like. The storage unit 1101 may be a memory.

Figure 12:
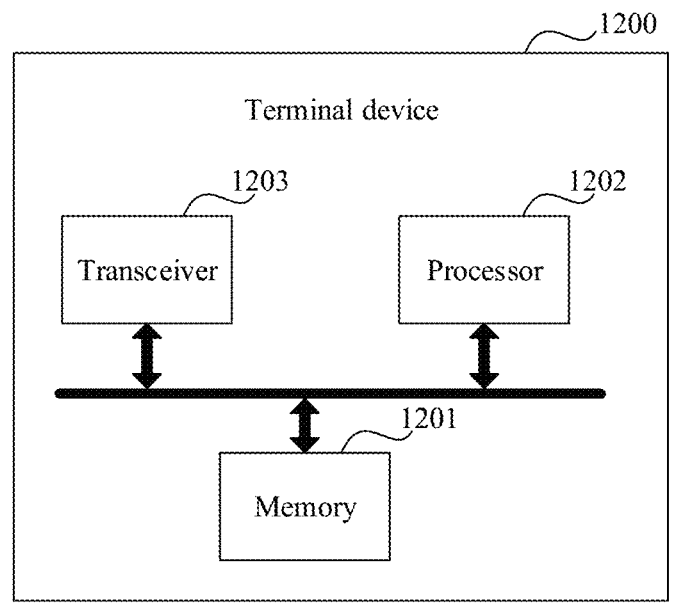
FIG. 12 is a schematic diagram of another possible terminal device according to this application.

When the processing unit 1102 is a processor, the communications unit 1103 is a transceiver, and when the storage unit 1101 is a memory, the terminal device in this application may be a terminal device shown in FIG. 12.

As shown in FIG. 12, the terminal device 1200 includes: a processor 1202, a transceiver 1203, and a memory 1201. The transceiver 1203, the processor 1202, and the memory 1201 may communicate with each other through an internal connection channel to transfer a control signal and/or a data signal.

A person skilled in the art may clearly understand that, for brief and convenient description, for a specific working process of the foregoing described apparatuses and units, refer to a corresponding process in the foregoing method embodiments. Details are not described herein.

The terminal device 1100 and the terminal device 1200 provided in this application may send first request information to a network device based on an actual requirement, and detect a second message on a preset time-frequency resource. After receiving the first request information, the network device can determine a sending manner of first SI, for example, broadcast, multicast, or unicast, based on a quantity of terminal devices that currently request the first SI. This helps improve efficiency of obtaining the SI by the terminal device.

Figure 13:
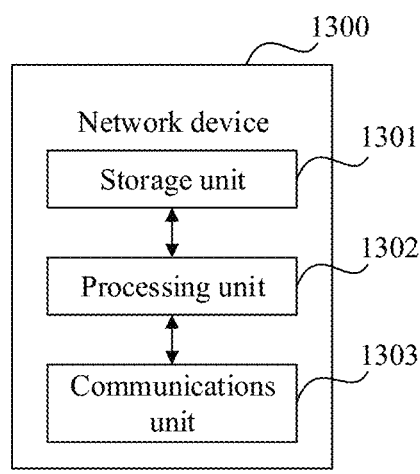
FIG. 13 is a schematic diagram of a possible network device according to this application.

FIG. 13 is a possible schematic structural diagram of the network device in the foregoing embodiments in a case in which an integrated unit is used. A network device 1300 includes a processing unit 1302 and a communications unit 1303. The processing unit 1302 is configured to control and manage an action of the network device 1300. For example, the processing unit 1302 is configured to support the network device 1300 in performing S310 in FIG. 10 by using the communications unit 1303 and/or another process of the technology described in this specification. The communications unit 1303 is configured to support the network device 1300 in communicating with another network entity, for example, communicating with a terminal device. The network device 1300 may further include a storage unit 1301, configured to store program code and data of the network device 1300.

The processing unit 1302 may be a processor or a controller, for example, a CPU, a general-purpose processor, a DSP, an ASIC, an FPGA or another programmable logic device, a transistor logic device, a hardware component, or any combination thereof. The processing module 1302 may implement or execute various example logical blocks, modules, and circuits described with reference to content disclosed in this application. Alternatively, the processor may be a combination for implementing a computing function, for example, a combination of one or more microprocessors or a combination of a DSP and a microprocessor. The communications unit 1303 may be a transceiver, a transceiver circuit, or the like. The storage unit 1301 may be a memory.

Figure 14:
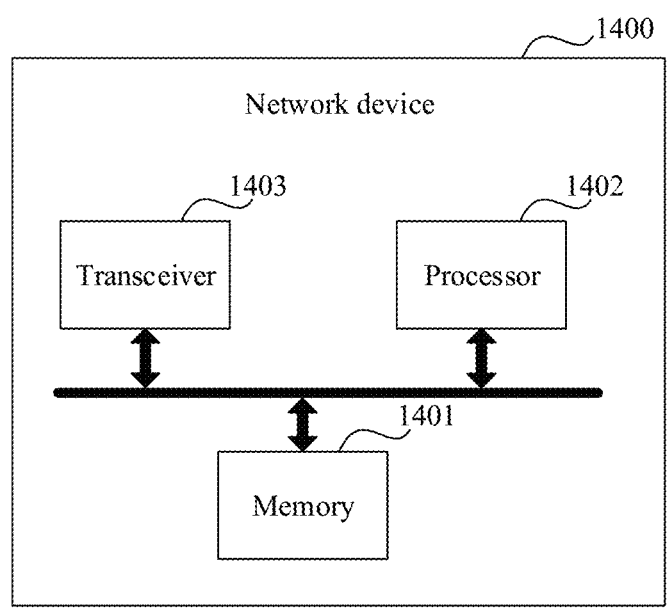
FIG. 14 is a schematic diagram of another possible network device according to this application.

When the processing unit 1302 is a processor, the communications unit 1303 is a transceiver, and when the storage unit 1301 is a memory, the network device in this application may be a network device shown in FIG. 14.

As shown in FIG. 14, the terminal device 1400 includes a processor 1402, a transceiver 1403, and a memory 1401. The transceiver 1403, the processor 1402, and the memory 1401 may communicate with each other through an internal connection channel to transfer a control signal and/or a data signal.

A person skilled in the art may clearly understand that, for brief and convenient description, for a specific working process of the foregoing described apparatuses and units, refer to a corresponding process in the foregoing method embodiments. Details are not described herein.

After receiving the first request information, the network device 1300 and the network device 1400 for data transmission provided in this application can determine a sending manner of the first SI, for example, broadcast, multicast, or unicast, based on a quantity of terminal devices that currently request the first SI. Therefore, the method for sending SI provided in this application helps improve efficiency of obtaining the SI by the terminal device.

It should be understood that the transceiver may include a transmitter and a receiver. The transceiver may further include an antenna. There may be one or more antennas. The memory may be a separate component, or may be integrated in the processor. Each of the foregoing components or some components may be integrated in a chip for implementation, for example, integrated in a baseband chip for implementation.

A network device or a terminal device in an apparatus embodiment fully corresponds to a network device or a terminal device in a method embodiment. A corresponding module performs a corresponding step. For example, a sending module or a transmitter performs a sending step in the method embodiment, and a receiving module or a receiver performs a receiving step in the method embodiment. Steps other than the sending and receiving steps may be performed by a processing module or a processor. For a function of a specific module, refer to a corresponding method embodiment. Details are not described again herein.

An embodiment of this application further provides a communications chip. The communications chip stores an instruction. When the instruction is run on the terminal device 1100 or the terminal device 12000, the communications chip is enabled to perform the method corresponding to the terminal device in the foregoing implementations.

An embodiment of this application further provides a communications chip. The communications chip stores an instruction. When the instruction is run on the network device 1100 or the network device 1200, the communications chip is enabled to perform the method corresponding to the network device in the foregoing implementations.

In various embodiments of this application, sequence numbers of the foregoing processes do not mean execution sequences. The execution sequences of the processes should be determined based on functions and internal logic of the processes, and should not be construed as any limitation on the implementation processes of this application.

In addition, the term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

Methods or algorithm steps described with reference to the content disclosed in this application may be implemented by hardware, or may be implemented by a processor executing a software instruction. The software instruction may include a corresponding software module. The software module may be stored in a random access memory (RAM), a flash memory, a read-only memory (ROM), an erasable programmable read only memory (EPROM), an electrically erasable programmable read only memory (EEPROM), a register, a hard disk, a mobile hard disk, a compact disc read-only memory (CD-ROM), or any other form of storage medium well-known in the art. For example, a storage medium is coupled to a processor, so that the processor can read information from the storage medium and can write the information into the storage medium. Certainly, the storage medium may alternatively be a component of the processor. The processor and the storage medium may be located in an ASIC. In addition, the ASIC may be located in the terminal device. Certainly, the processor and the storage medium may exist in a terminal device or a network device as discrete components.

All or some of the foregoing embodiments may be implemented by using software, hardware, firmware, or any combination thereof. When software is used to implement the embodiments, the embodiments may be implemented or partially in a form of a computer program product. The computer program product includes one or more computer instructions. When the computer program instructions are loaded and executed on a computer, all or some of the procedures or functions according to this application are generated. The computer may be a general-purpose computer, a dedicated computer, a computer network, or another programmable apparatus. The computer instruction may be stored in a computer-readable storage medium, or may be transmitted by using the computer readable storage medium. The computer instruction may be transmitted from a web site, a computer, a server or a data center to another website, another computer, another server, or another data center in a wired manner (for example, a coaxial cable, an optical fiber, or a digital subscriber line (digital subscriber line, DSL)) or a wireless manner (for example, infrared, radio, or a microwave). The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD), a semiconductor medium (for example, a solid state disk (SSD)), or the like.

The objectives, technical solutions, and beneficial effects of this application are further described in detail in the foregoing specific implementations. It should be understood that the foregoing descriptions are merely specific implementations of this application, but are not intended to limit the protection scope of this application. Any modification, equivalent replacement, improvement, or the like made based on the technical solutions of this application shall fall in the protection scope of this application.

What is claimed is:

1. A method, comprising:
    sending, by a terminal device, a first message to a network device, wherein the first message comprises first request information, the first request information indicates a request of first system information (SI);
    detecting, by the terminal device, a second message;
    obtaining, by the terminal device, the first SI from the second message, wherein the second message comprises information responding to the request indicated in the first request information; and
    retransmitting, by the terminal device, the first message to the network device in a first time unit,
    wherein the second message is not detected, or the second message does not comprise the information responding to the request indicated in the first request information,
    wherein the first time unit follows a second time unit, and
    wherein the second time unit is a time unit in which the terminal device detects the second message.

2. The method according to claim 1, wherein the sending the first message comprises:
    sending, by the terminal device, the first message to the network device by using a first code domain resource and a first time-frequency resource, wherein the first code domain resource and the first time-frequency resource are resources in a physical random access channel (PRACH) resource set, and the first code domain resource and the first time-frequency resource meet at least one of:
        the first code domain resource is only used to transmit the first message jointly with the first time-frequency resource, or
        the first time-frequency resource is only used to transmit the first message jointly with the first code domain resource.

3. The method according to claim 1, wherein the first request information comprises a bitmap, a quantity M of bits in the bitmap is less than or equal to a quantity N of types of SI in a communications system in which the terminal device is located, the bitmap indicates the first SI, the first SI is SI in the communications system, and M and N are positive integers.

4. The method according to claim 1, wherein the obtaining the first ST comprises:
obtaining, by the terminal device, second ST from the second message,
wherein the second SI belongs to the first SI, or the second SI comprises the first SI, and
wherein
the first message is a message (MSG) 1, and the second message is a MSG 2 or a response message in an SI window corresponding to the first SI,
the first message is the MSG 1, and the second message is the response message in the SI window corresponding to the first SI,
the first message is a MSG 3, and the second message is a MSG 4, or
the first message is the MSG 3, and the second message is the response message in the SI window corresponding to the first SI.

5. The method according to claim 1, further comprising:
receiving, by the terminal device from the network device, at least one of backoff indication information or quantity indication information, wherein the backoff indication information indicates an interval between the first time unit and the second time unit, and the quantity indication information indicates a maximum quantity of transmission times of a MSG 1.

6. The method according to claim 1, further comprising:
performing, by the terminal device, cell reselection, wherein a quantity of times that the first message has been transmitted is equal to a maximum quantity of transmission times of the first message.

7. The method according to claim 1, wherein the second message further indicates remaining SI that needs to be further scheduled.

8. A method, comprising:
receiving, by a network device, a first message from a terminal device, wherein the first message comprises first request information, and the first request information indicates a request of first system information (SI);
sending, by the network device, a second message to the terminal device, wherein the second message comprises information responding to the request indicated in the first request information; and
receiving, by the network device, the first message retransmitted by the terminal device in a first time unit,
wherein the second message is not detected by the terminal device, or the second message does not comprise the information responding to the request indicated in the first request information,
wherein the first time unit follows a second time unit, and
wherein the second time unit is a time unit in which the terminal device detects the second message.

9. The method according to claim 8, wherein the receiving the first message comprises:
receiving, by the network device, the first message from the terminal device by using a first code domain resource and a first time-frequency resource, wherein the first code domain resource and the first time-frequency resource are resources in a physical random access channel (PRACH) resource set, and the first code domain resource and the first time-frequency resource meet at least one of:
the first code domain resource is only used to transmit the first message jointly with the first time-frequency resource, or
the first time-frequency resource is only used to transmit the first message jointly with the first code domain resource.

10. The method according to claim 8, wherein the first request information comprises a bitmap, a quantity M of bits in the bitmap is less than or equal to a quantity N of types of SI in a communications system in which the network device is located, the bitmap indicates the first SI, the first SI is SI in the communications system, and M and N are positive integers.

11. The method according to claim 8, wherein the second message comprises second SI,
wherein the second SI belongs to the first SI, or the second SI comprises the first SI, and
wherein
the first message is a message (MSG) 1, and the second message is a MSG 2 or a response message in an SI window corresponding to the first SI,
the first message is the MSG 1, and the second message is the response message in the SI window corresponding to the first SI,
the first message is a MSG 3, and the second message is a MSG 4, or
the first message is the MSG 3, and the second message is the response message in the SI window corresponding to the first SI.

12. An apparatus, comprising:
at least one processor; and
a non-transitory computer readable storage medium storing programming for execution by the at least one processor, the programming including instructions to:
send a first message to a network device, wherein the first message comprises first request information, the first request information indicates a request of first system information (SI); and
detect a second message;
obtain the first SI from the second message, wherein the second message comprises information responding to the request indicated in the first request information; and
retransmit the first message to the network device in a first time unit,
wherein detection of the second message is not detected, or the second message does not comprise the information responding to the request indicated in the first request information,
wherein the first time unit follows a second time unit, and
wherein the second time unit is a time unit in which the apparatus detects the second message.

13. The apparatus according to claim 12, the programming further including instructions to:
send the first message to the network device by using a first code domain resource and a first time-frequency resource, wherein the first code domain resource and the first time-frequency resource are resources in a physical random access channel (PRACH) resource set, and the first code domain resource and the first time-frequency resource meet at least one of:
the first code domain resource is only used to transmit the first message jointly with the first time-frequency resource, or
the first time-frequency resource is only used to transmit the first message jointly with the first code domain resource.

14. The apparatus according to claim 12, wherein the first request information comprises a bitmap, a quantity M of bits in the bitmap is less than or equal to a quantity N of types of SI in a communications system in which the apparatus is located, the bitmap indicates the first SI, the first SI is SI in the communications system, and M and N are positive integers.

15. The apparatus according to claim 12, the programming further including instructions to:
obtain second SI from the second message, wherein the second SI belongs to the first SI, or the second SI comprises the first SI, and
wherein
the first message is a message (MSG) 1, and the second message is a MSG 2 or a response message in an SI window corresponding to the first SI,
the first message is the MSG 1, and the second message is the response message in the SI window corresponding to the first SI,
the first message is a MSG 3, and the second message is a MSG 4, or
the first message is the MSG 3, and the second message is the response message in the SI window corresponding to the first SI.

16. An apparatus, comprising:
at least one processor; and
a non-transitory computer readable storage medium storing programming for execution by the at least one processor, the programming including instructions to:
receive a first message from a terminal device, wherein the first message comprises first request information, the first request information indicates a request of first system information (SI);
send a second message to the terminal device, wherein the second message comprises information responding to the request indicated in the first request information; and
receive the first message retransmitted by the terminal device in a first time unit,
wherein the second message is not detected by the terminal device, or the second message does not comprise the information responding to the request indicated in the first request information,
wherein the first time unit follows a second time unit, and
wherein the second time unit is a time unit in which the terminal device detects the second message.

17. The apparatus according to claim 16, the programming further including instructions to:
receive the first message from the terminal device by using a first code domain resource and a first time-frequency resource, wherein the first code domain resource and the first time-frequency resource are resources in a physical random access channel PRACH resource set, and the first code domain resource and the first time-frequency resource meet at least one of:
the first code domain resource is only used to transmit the first message jointly with the first time-frequency resource, or
the first time-frequency resource is only used to transmit the first message jointly with the first code domain resource.

18. The apparatus according to claim 16, wherein the first request information comprises a bitmap, a quantity M of bits in the bitmap is less than or equal to a quantity N of types of SI in a communications system in which the apparatus is located, the bitmap indicates the first SI, the first SI is SI in the communications system, and M and N are positive integers.

19. The apparatus according to claim 16, wherein the second message comprises second SI,
wherein the second SI belongs to the first SI, or the second SI comprises the first SI, and wherein
the first message is a message (MSG) 1, and the second message is a MSG 2 or a response message in an SI window corresponding to the first SI,
the first message is the MSG 1, and the second message is the response message in the SI window corresponding to the first SI,
the first message is a MSG 3, and the second message is a MSG 4, or
the first message is the MSG 3, and the second message is the response message in the SI window corresponding to the first SI.

* * * * *